United States Patent
Lang

[15] 3,657,921
[45] Apr. 25, 1972

[54] METHOD AND APPARATUS FOR TESTING THE HARDNESS OF MATERIALS

[72] Inventor: Elliot R. Lang, Hamden, Conn.
[73] Assignee: American Chain & Cable Company, Inc., New York, N.Y.
[22] Filed: Dec. 31, 1969
[21] Appl. No.: 889,764

[52] U.S. Cl. .................................................. 73/83, 73/81
[51] Int. Cl. ............................................................ G01n 3/44
[58] Field of Search ................... 73/83, 81, 82, 84; 92/44, 43, 92/34; 308/DIG. 1

[56] References Cited

UNITED STATES PATENTS

| | | | |
|---|---|---|---|
| 2,107,114 | 2/1930 | Gogan | 73/83 |
| 1,768,512 | 6/1930 | De Leeuw | 73/81 |
| 2,498,136 | 2/1950 | Rupley | 73/83 |
| 2,628,495 | 2/1953 | Day | 73/83 |
| 2,839,917 | 6/1958 | Webster | 73/81 |
| 3,012,827 | 12/1961 | Goetz | 308/35 |
| 3,030,744 | 4/1962 | Mueller | 51/225 |
| 3,102,417 | 9/1963 | Chambers | 73/81 |
| 3,457,839 | 7/1969 | Mills | 92/34 |

Primary Examiner—Richard C. Queisser
Assistant Examiner—Ellis J. Koch
Attorney—Pennie, Edmonds, Morton, Taylor and Adams

[57] ABSTRACT

Method and apparatus for testing the hardness of materials comprising means for effecting contact between the test material and an indenter by moving the test material under a progressively changing force into contact with the indenter to apply a minor and major load thereby producing two indentations of differing depth in the test material. The permanent depth of the indentation produced by application of the major load is determined by measuring the difference between the position of the indenter with respect to the test material when the minor load is applied both before and after the major load is applied and removed.

4 Claims, 3 Drawing Figures

INVENTOR.
ELLIOT R. LANG

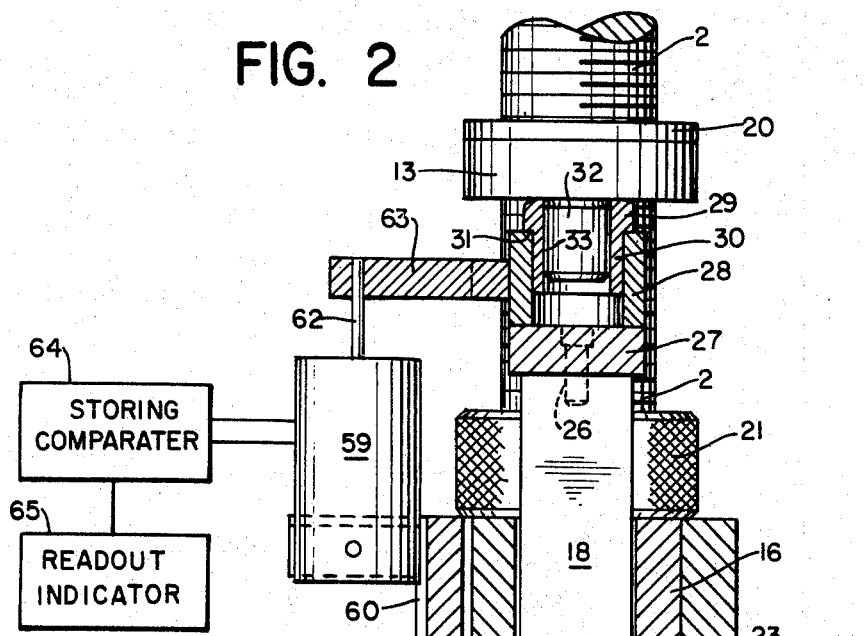
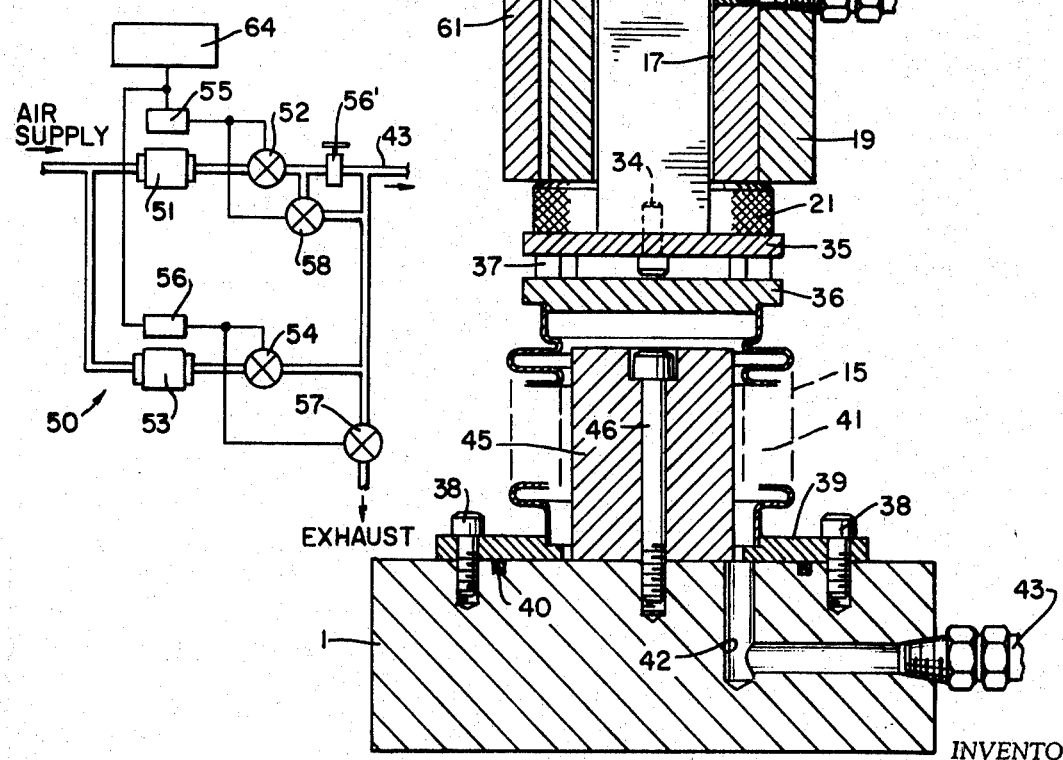

3,657,921

METHOD AND APPARATUS FOR TESTING THE HARDNESS OF MATERIALS

BACKGROUND OF THE INVENTION

The hardness of metal and other material can be determined by measuring the depth of permanent indentation produced in the surface of the test material by the application of an indenter to that surface under a given applied load which is commonly referred to as the major load. To obtain this measurement a double indentation method is commonly employed. Under this method, a reference point is first established by effecting contact between the indenter and the test material first under a minor load to produce a slight indentation in the surface of the test material and then under a major load of known magnitude greater than the minor load to further indent the surface of the test material. Next, the difference between the depth of the indentations produced by the major and minor load is measured. This measurement is expressed in terms of a standard unit of hardness measurement, such as a Rockwell number, to obtain a hardness measurement of the test material.

In hardness testing equipment which utilizes the double indentation technique, the minor and major loads are generally applied by separate means acting independently of each other. For instance, in a Rockwell tester, the means for applying the minor load comprises a mechanical screw acting on the test material to move it into penetrating engagement with indenter while the means for applying the major load comprises a loading arm assembly which is moved into contact with the indenter under a force produced by falling dead weights. Due to the fact that separate means are employed for applying the major and minor load, extra time is required to complete the loading and unloading cycle. Typically 3 to 6 seconds are consumed for this purpose. If higher speeds are attempted, the weights start to swing and the loading becomes inconsistent. This, in turn, results in inaccurate hardness measurements. Because of limitations on the speed of the testing cycle, the conventional Rockwell tester is not particularly suitable for testing the hardness of successively fed items as, for example, items coming off an assembly line manufacturing operation and requiring quality control checking of their hardness.

The loading arm assembly of the Rockwell tester includes a loading arm and a series of dead weights which are operatively connected to the loading arm via a suitable linkage assembly in such a manner that upon release of the weights the loading arm is caused to undergo corresponding downward movement into forceful engagement with the indenter under the force of the major load. The rate of downward movement of the loading arm is generally controlled by a suitable dash pot arrangement. Despite the controlled nature of the descent of the loading arm, the force under which the indenter is brought to bear against the surface of the test material is apt to build up too rapidly producing what is commonly referred to as shock loading of the test material. Shock loading and, in particular, variations in shock loading can, for reasons well known in the art, be a significant cause of inaccuracy in indentation hardness testing. The use of a dash pot in a Rockwell tester effectively confines the degree of shock loading within acceptable limits.

In other hardness testers utilizing a double indentation technique, the means for applying the minor load comprises, like the Rockwell tester, a mechanical screw acting on the test material in one direction while the means for applying the major load comprises an elaborate and complex bellows arrangement acting on the indenter in the opposite direction. In addition to being costly and complex, such constructions also require extra time to complete the loading and unloading cycle.

Conventional hardness testers which utilize a double indentation technique for measuring the hardness of materials require that the indenter and the test material be supported for relative movement with respect to each other. For this purpose various types of mechanical means have been devised for guiding the indenter and test material into contact position in proper alignment for making acceptable indentations. For instance, various combinations of springs, mechanical bearings, elaborate frames and housing structures, and other alignment controlling devices have been provided for this purpose. These constructions create errors in measurement due to friction, bearing play and other conditions inherent in the operation of such constructions.

SUMMARY OF THE INVENTION

In accordance with the teachings of the present invention a high speed apparatus and method is provided for measuring the hardness of materials fed rapidly through the apparatus. Broadly, the apparatus of the present invention is of the type wherein the permanent depth of indentation produced in the test material under a major load is measured to obtain a reading of the hardness of the test material. In construction, the apparatus generally includes a frame structure, an indenter mounted on the frame structure, a support member also mounted on the frame structure for supporting the test material, and a drive for moving the support with the test material thereon against the indenter under the minor and major loads. An air bearing assembly is provided for slidably mounting the support member on the frame structure for movement toward the indenter substantially free of frictional forces so that the depth of the indentation produced for a given applied load will be a function solely of that load.

The drive for moving the test material into contact with the indenter under the minor and major loads is provided by pneumatic means in the form of a bellows. The bellows is operatively connected to the air bearing assembly and, when activated, it acts in a single direction to apply the minor and major loads in the proper sequence to the support member and the test material resting thereon to bring the test material into penetrating engagement with the indenter. Compressed gas is supplied to the bellows at a progressively changing pressure from an automatically regulated supply source to produce the minor and major load in quick succession. The use of a pneumatically operated bellows for applying the minor and major load insures that these loads do not build up to peak value instantaneously and produce damaging shock loads on the test material.

A filler block is positioned within the bellows to reduce the volume of the pressure chamber defined by the bellows so that the pressure builds up quickly enough to allow the testing apparatus to be used for high speed testing of numerous test specimens.

The hardness testing apparatus of this invention also includes means for measuring the depth of the indentation produced in the test material under the major load. This means is controlled by the regulated air supply controlling the bellows drive and operates such that deflection of the test material caused by spring compression under the major load is allowed to occur before a depth measurement is taken. In construction, this means includes an electromagnetic position transducer which is operatively connected to the test material. The transducer produces an output signal indicative of the position of the test material with respect to the fixed indenter. Two selected position signals from the transducer are fed into a storing comparator comprising selectively operably circuit means for producing a single output signal which is indicative of the difference between the two selected position signals. One of the selected position signals from the transducer is indicative of the position of the test material with respect to the indenter when the minor load is applied. The other of these selected output signals is also indicative of the position of the test material with respect to the indenter when the minor load is applied but after the major load has been applied and removed. The output signal from the storing comparator representing the difference between these two position signals is therefore indicative of the depth of permanent indentation produced under the major load. This output signal is displayed by a conventional readout indicator.

BRIEF DESCRIPTION OF THE DRAWINGS

FIG. 2 is a cross-sectional view of the hardness testing apparatus of this invention taken along the lines 2—2 of FIG. 1 and showing also a diagrammatic representation of the selectively operable measuring means.

FIG. 3 is a schematic view of the regulator means for controlling the pressure of compressed air supplied to the bellows and the selectively operable measuring means of the present invention.

DETAILED DESCRIPTION OF THE INVENTION

Figure 1:
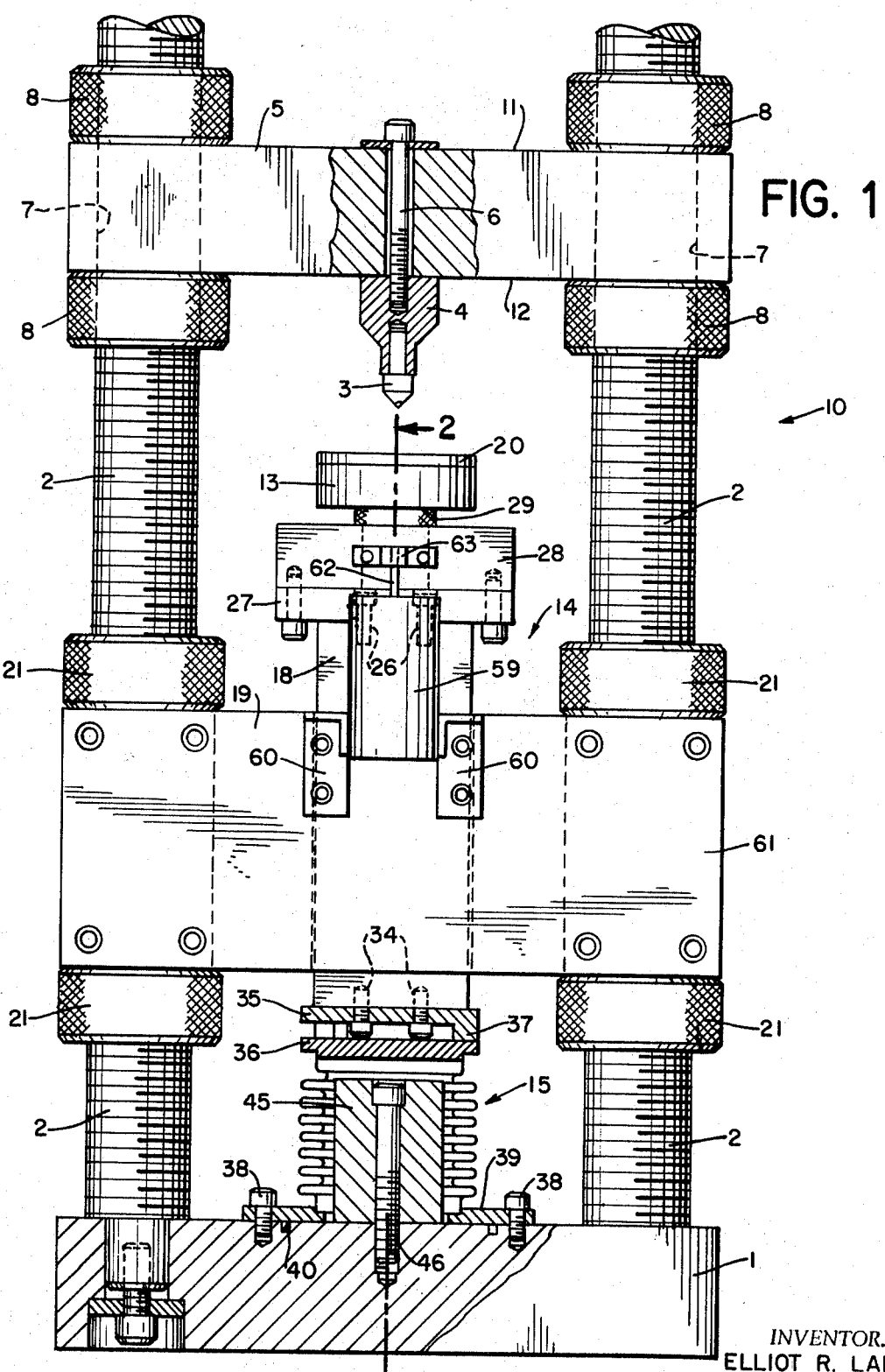
FIG. 1 is an elevation view, partly broken away, of the hardness testing apparatus of the present invention showing the mechanical features thereof.

As shown in FIG. 1, the testing apparatus of the present invention includes a frame structure indicated generally at 10, comprising a base member 1 and two threaded support columns 2 upstanding from either side of the base member. An indenter 3 made of diamond or other suitable material is mounted in holder 4 which, in turn, is attached to frame piece 5 by bolt means 6 in the manner shown in FIG. 1. The frame piece 5 extends horizontally between support columns 2 and the support columns extend longitudinally through receiving holes 7 disposed in the terminal ends of the support piece for this purpose. The support piece 5 is supported in this position by threaded retainer nuts 8 tightly engaging the upper and lower surface 11 and 12 respectively of the frame piece. Although the indenter is held in a fixed position during operation of the testing apparatus, the above described construction of the structure supporting the indenter advantageously permits the indenter to be moved to various vertical positions simply by adjusting retainer nuts 8 the purpose of which will be described more fully below.

The test material 20 is supported below the indenter 3 by anvil 13. The test material 20 is shown in FIG. 1 in its pre-test position wherein the upper surface of the test material is spaced apart from the tip of the indenter.

For the purpose of causing the upper surface of the test material to be indented so that hardness measurements can be obtained, drive means are provided for effecting contact between the indenter and test material under the minor and major loads to produce two indentations of differing depth in the test material. This means comprises an air bearing assembly, indicated generally by reference numeral 14, for slidably mounting the anvil on the frame structure so that it may be moved toward the stationary indenter and pneumatic means in the form of a bellows 15 coacting with the air bearing assembly 14 for progressively moving the anvil in an upward direction and the test material supported thereon into penetrating engagement with the indenter under the minor and major loads.

As shown most clearly in FIG. 2, the air bearing assembly 14 includes a bearing housing 16 having a precision bore 17 and a bearing slide 18 extending longitudinally through the bore 17. The housing 16 is attached to bearing support 19 extending horizontally between the columns 2 at a point located below the indenter. Bearing support 19 is held in a fixed vertical position by retainer nuts 21 in the same manner as frame piece 5 described above in connection with FIG. 1. Like the frame piece 5 the bearing support 19 may be conveniently moved to the desired vertical position simply by adjusting retainer nuts 21.

The bearing slide 18 is supported within the bore 17 for substantially friction-free movement in a longitudinal direction by a relatively stiff curtain of pressurized gas surrounding the bearing slide and acting against the interior surface of the bore 17 and the exterior surface of the bearing slide 18. Pressurized gas is supplied to the space between the bore and the bearing slide by a plurality of gas jets 22 symetrically disposed about the bore. The gas jets 22 are, in turn, supplied with compressed gas via supply duct 23 and conduit 24 from an external supply source (not shown).

The upper end of the bearing slide 18 is connected by bolt 26 to capping plate 27 which supports a cylindrical seating member 28. A removable arbor 29 having a reduced diameter portion 30 is disposed within the seating cylinder so that the shoulder 31 is in contact with the upper end of the seating member 28. The anvil has a shaft extension 32 which fits within the centrally disposed bore 33 in arbor 29.

The lower end of the bearing slide 18 is connected by bolt 34 to bottom thrust plate 35 which in turn rests on pressure flange 36 of bellows 15. The thrust plate 35 has three evenly spaced pods 37 depending downwardly from the under surface of the thrust plate to provide a tilt-free uniform support for the bearing slide 18. The bearing slide is uniformly supported by the pods 37 in the sense that its mass is evenly distributed on the pressure flange 36 of bellows 15. Due to the stiffness of the air bearing supporting the bearing slide 18 in the housing 16 and due to the even distribution of the weight of the bearing slide on the pressure flange, the test material is provided with substantially wobble-free movement as it is being advanced toward the indenter under the driving force of bellows 15, all of which will be described in more detail below.

The bellows is connected to the upper surface of base member 1 by bolt means 38 extending through the bottom flange 39 of the bellows. The air pressure chamber 41 defined by the bellows 15 is sealed in airtight relationship with the base member 1 by O-ring 40. Pressurized gas is supplied to chamber 41 by a supply duct 42 and conduit 43 from an automatically regulated supply of compressed air (not shown).

A filler block 45 is disposed within the bellows 15 and connected to the base member 1 by bolt means 46. The filler block 45 is constructed to reduce the volume of the gas chamber 41 defined by the bellows so that pressure within this chamber may build up in a relatively rapid manner but not rapidly enough to produce abrupt movement of the test material into contact with the indenter. This feature advantageously aids in reducing the length of the loading and unloading cycle.

The bellows acts to move the test material into penetrating engagement with indenter under a progressively changing force to sequentially apply the minor and major loads. The progressively changing force on the test material is provided by controlling the air pressure in bellows 15. For this purpose, the pressure of the gas supplied to the bellows is automatically controlled by regulator means, indicated generally by reference numeral 50 in FIG. 3.

The regulator means comprises a regulator 51 communicating in series with shut-off valve 52 and a regulator 53 communicating in series with a shut-off valve 54. As shown, regulator 51 and shut-off valve 52 communicate in parallel with regulator 53 and shut-off valve 54. The regulator means also includes a flow control valve 56' connected in series with regulator 51 and shut-off valve 52. Switch mechanisms 55 and 56 are timed for operating the various valves 52, 54 and 56'. Also, switch mechanisms 56 and 55 operate exhaust valve 57 and the exhaust bleed valve 58. Compressed gas is supplied to the regulator means from a supply source (not shown). The operation of the regulator means will be described below in the portion of the specification wherein a description of the operation of the hardness testing apparatus of this invention appears.

The testing apparatus of the present invention also includes means for measuring the depth of the indentation produced in the test material when it is applied against the stationary indenter under the major load. In the presently preferred embodiment of this invention, this means includes an electromagnetic position transducer 59 the output of which is indicative of the position of the test material with respect to the indenter. The transducer is connected to the bearing support 19 by bracket 60 and front plate 61 in the manner shown in FIG. 2. The core 62 of the transducer is attached to arm 63 which is operatively connected to the test material via seating member 28. With this arrangement, the output voltage of the transducer at any given instant is indicative of the position of the arm which, in turn, is indicative of the position of the test material with respect to the fixed position indenter. It will be recognized, therefore, that a voltage value which represents the difference between the output voltage of the transducer at two different positions of the test material with respect to the indenter is indicative of the difference in the depth of the indentations produced in the test material under the applied loads at each of these two positions.

For the purpose of determining this voltage value, the output of the transducer is fed into a storing comparator 64. The comparator comprises selectively operable circuit means for storing a voltage signal indicative of the position of the test material under the minor load and thereafter comparing this voltage signal with an input voltage signal indicative of the position of the test material under the minor load after the major load has been applied and removed. In making this comparison the comparator produces single output signal indicative of the difference between the two positions of the test material which is effectively a measurement of the depth of the permanent indentation produced in the test material under the major load. The single output signal from the storing comparator is displayed by a conventional read-out indicator 65.

The storing comparator is activated by the switch mechanisms of the pressure regulator means in a manner which will now be described in the following portion of the specification wherein the operation of the hardness testing apparatus of this invention is described.

In operation, a test specimen is first placed on the anvil. This may be accomplished manually or by providing a suitable automatic feeding mechanism for this purpose. The initial position of the indenter is adjusted so that its tip is spaced from the upper surface of the test material. In the event automatic feeding means is employed for positioning test specimens of different thickness on the anvil in a sequential fashion, the indenter is positioned so that the specimen having the greatest estimated thickness will be located in spaced relationship from the tip of the indenter when in position on the anvil. When its proper vertical position is determined, the indenter is fixed in that position by tightening retaining nuts 8 in the manner described above.

Next, the minor and major load values are determined and regulators 51 and 53 are set respectively to a pressure corresponding to these values. Shut-off valve 52 is initially open while shut-off valve 54, exhaust valve 57 and exhaust bleed valve 58 are closed. In this condition, pressure gradually builds up in the bellows to move the test material upward into forceful but relatively gentle penetrating contact with the indenter. The rate of build-up of pressure in the bellows is controlled by the flow control valve 56'. When the pressure corresponding to the minor load is reached a slight dwell period occurs at which time shut-off valve 52 is closed and storing comparator 64 is activated and deactivated by switch mechanism 55. The storing comparator 64 reads the output voltage of the transducer 59 to establish a reference voltage indicative of the position of the test material with respect to the indenter under the force of the minor load. This reference voltage is, as described above, stored in the storing comparator for comparison with another voltage signal at a later time. The storing comparator is activated and deactivated virtually instantaneously.

Simultaneously with closing of valve 52, shut-off valve 54 is opened by switch mechanism 56. With shut-off valve 54 now opened the pressure in the bellows continues to build up until the test material bears against the indenter under the force of the major load. At this point in the cycle, shut-off valve 54 is closed and exhaust bleed valve 58 and shut-off valve 52 are opened by switch mechanism 55. With the exhaust bleed valve now in open position, the bellows chamber is depressurized by bleeding through the shut-off valve 52 and regulator 51 until the minor load pressure is restablished. At this point the storing comparator is again activated and deactivated by switch mechanism 55. Thereby, the storing comparator again reads the output voltage of the transducer. This second voltage reading, which is indicative of the position of the test material with respect to the indenter under the applied force of the minor load after the major load has been applied and removed is compared to the stored reference voltage. This produces a voltage signal representing the difference between the two readings; and this signal is fed into the read-out indicator to obtain a comparative measurement of hardness. After the readings have been taken, exhaust valve 57 is opened by switch mechanism 56 and the pressure in bellows chamber 41 is reduced to zero. The test material is then removed and the process repeated for the purpose of testing the hardness of other test specimens. The value displayed by the read-out indicator may be compared automatically with the value previously determined for a control specimen of known hardness to quickly indicate whether the test material has a satisfactory hardness meeting predetermined quality standards.

Due to deflection resulting from spring compression the test material assumes a final operative position with respect to the indenter when the minor load is reestablished which lies between the initial position of the test material under minor load application and the position of the test material under major load application. This final position represents the true depth of the indentation produced by application of the major load. Since the major load is removed before the depth measurement is taken at this final position, there are no errors in the ultimate hardness measurement due to spring compression in either the test material or the frame structure of the testing apparatus. In other words, reverse movement of the test material due to spring compression is exhausted prior to measuring the final operative position of the test material with respect to the indenter.

From the above description of the operation of the hardness testing apparatus of this invention, it will be recognized that the minor and major loads are applied gradually in the sense that they are applied without producing shock loads. With the present invention, the minor and major loads are, despite the gentleness of their application, applied quite rapidly in the sense that very little time is consumed by the loading and unloading cycle. In fact, with the apparatus of the present invention, the time cycle for applying the minor and major load valves and taking a measurement of hardness of a test specimen is reduced by as much as 85 percent over the time period required with presently available hardness testing equipment utilizing double indentation techniques to measure hardness. This feature renders the testing apparatus of the present invention particularly attractive for use in high speed testing operations.

In addition to measuring the hardness of the test material, the apparatus of the present invention is uniquely capable of obtaining comparative measurements of thickness of the material being tested. For this purpose, the output voltage signal from the transducer at the minor load position of the test material may be compared with the output voltage signal at the minor load position of a control specimen of known thickness to thereby obtain a comparative measurement of the thickness of the test material with respect to the thickness of the control specimen. The comparative measurement so obtained will be in the form of a voltage signal representing the difference between the output voltage from the transducer at the minor load position of the test material and the voltage output from the transducer at the minor load position of the control specimen. However, if desired, this voltage value may be converted into standard units of linear measurement to obtain an absolute measurement of the thickness of the test material. While it is recognized that due to the possible differences in hardness between the test material and the control specimen, the position of the test material with respect to the indenter under the applied force of the minor load is not a true linear function of the thickness of the control specimen, nevertheless, a relatively accurate approximation of the test material thickness can be obtained with the apparatus of the present invention. For most applications where thickness measurements of the test material are needed, exact measurements are not required. Of course, if the control specimen and the test material have the same hardness values, the measurement of thickness obtained will be precise.

I claim:
1. Apparatus for testing the hardness of materials comprising:
   a. a frame structure;
   b. an indenter held in a fixed position with respect to said frame structure;
   c. a support for a test material;
   d. pneumatic means for progressively moving said support with the test material thereon into penetrating engagement with the indenter under a progressively changing force to apply a minor and major load producing two indentations of differing depth in the test material, said pneumatic means including conduit means for connecting said support to a source of pneumatic pressure;
   e. signal generating means for producing a first signal indicative of the position of the test material with respect to the indenter under a force equal to the minor load and a second signal indicative of the position of the test material relative to the indenter under a force equal to the major load;
   f. regulator means for indicating a first pressure within said conduit urging the workpiece against the penetrator under said minor load and a second pressure corresponding to said major load; and
   g. switch means for actuating said signal generating means to produce said first signal when said regulator means indicates said first pressure and to produce said second signal when said regulator means indicates said second pressure.

2. Apparatus according to claim 1 wherein:
   a. a bellows connecting said conduit means to said support.

3. Apparatus according to claim 1 wherein:
   a. said conduit means includes first and second parallel branch conduits connected to said support;
   b. said regulator means includes:
      1. a first pressure regulator and shut-off valve in said first branch conduit, and
      2. a second pressure regulator and shut-off valve in said second branch circuit; and
   c. said switch means includes:
      1. a first switch for actuating said first shut-off valve to shut said valve off when said first pressure regulator indicates said first pressure and to open said valve when said second pressure regulator indicates said second pressure, and
      2. a second switch for actuating said second shut-off valve to open said valve when said first pressure regulator indicates said first pressure and to close said valve when said second pressure regulator indicates said second pressure.

4. Apparatus according to claim 1 further comprising:
   a. selectively operable circuit means adapted to receive said first and second signals and to produce a single output signal indicative of the difference between said first and second signals.

* * * * *